United States Patent [19]

Schwartz

[11] 4,186,725

[45] Feb. 5, 1980

[54] SOLAR ENERGY COLLECTOR

[76] Inventor: David M. Schwartz, 137 Foster St., Boston, Mass. 02135

[21] Appl. No.: 891,210

[22] Filed: Mar. 29, 1978

[51] Int. Cl.² .................... F24J 3/02; F28F 7/00; F16L 55/00
[52] U.S. Cl. ............................ 126/443; 126/418; 126/451; 126/901; 165/82; 165/154; 285/138; 285/187
[58] Field of Search .............. 126/271, 270; 285/187, 285/DIG. 12, 47, 138; 165/81, 82, 83, 154; 237/1 A

[56] References Cited

U.S. PATENT DOCUMENTS

| Re. 29,833 | 11/1978 | Mlavsky | 126/271 |
|---|---|---|---|
| 2,831,326 | 4/1958 | Richards et al. | 285/187 |
| 3,068,026 | 12/1962 | McKamey | 285/187 |
| 3,207,533 | 9/1965 | Van Gundy et al. | 285/187 |
| 3,227,153 | 1/1966 | Godel et al. | 126/271 |
| 3,916,871 | 11/1975 | Estes et al. | 126/271 |
| 4,016,860 | 4/1977 | Moan | 126/271 |
| 4,018,215 | 4/1977 | Pei | 285/DIG. 12 |
| 4,059,093 | 11/1977 | Knowles et al. | 126/271 |
| 4,099,746 | 7/1978 | Kontsch | 285/138 |

Primary Examiner—Samuel Scott
Assistant Examiner—Daniel J. O'Connor
Attorney, Agent, or Firm—Wolf, Greenfield & Sacks

[57] ABSTRACT

A solar energy collector comprises a metal tube through which solar-heated fluids may pass. The metal tube is maintained in a high vacuum environment, in the order of $10^{-6}$ torr, by a coaxial transparent glass tube and a pair of metal bellows sealing the ends of the glass tube to the metal tube in flexible seals designed to accommodate relative radial and linear expansion of the glass. The metal tube may be coated with a suitable absorption layer and the assembly of the metal and glass tubes may form a part of a solar system, such, for example, as a nonimaging concentrator in which the tubes are positioned longitudinally of and within an elongated parabolic reflector.

2 Claims, 5 Drawing Figures

U.S. Patent    Feb. 5, 1980    4,186,725
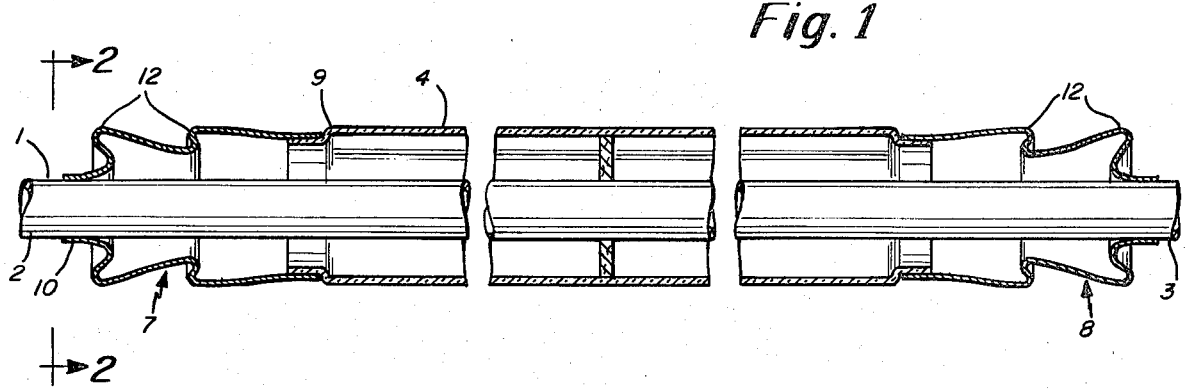
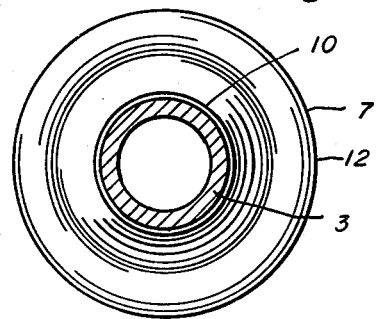
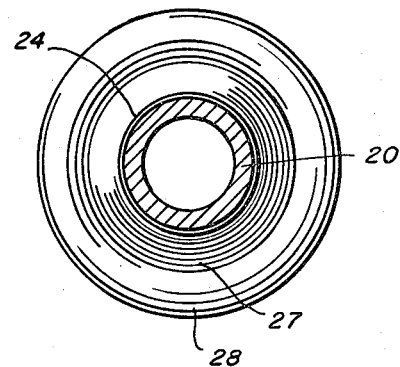
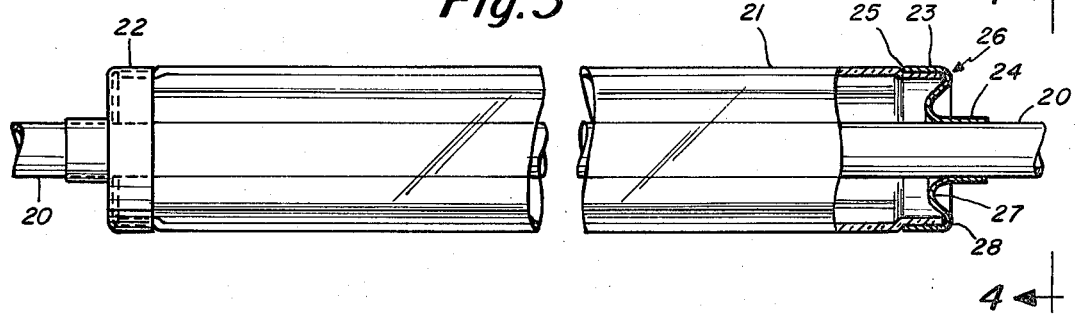
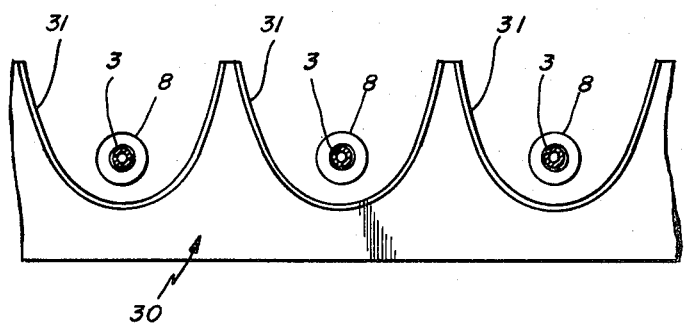

SOLAR ENERGY COLLECTOR

SUBJECT MATTER OF INVENTION

The present invention relates to an improved means and method of providing a vacuum along an operative length of a metal tube functioning as a solar heat transducer. In the present invention, a metal tube used to conduct solar-heated fluid is maintained in a vacuum along a major portion of its length by a transparent glass tube enclosing a length of the metal tube and sealed to it at each end by flexible bellows.

BACKGROUND OF INVENTION

Solar heating systems generally fall into two broad catagories. They include nonimaging concentrators that do not focus the sun and imaging or focusing concentrators that operate on the same principle as a flashlight and mirror or magnifying glass. The present invention is directed primarily to an improved feature of a solar transducer used primarily in nonimaging concentrators for high temperature applications. Many of these nonimaging concentrators use a vacuum system in which an insulated metal tube, maintained in a tubular glass envelope under vacuum collects heat in a fluid passing through the metal tube. Many early attempts to use this type of metal tube solar energy transducer have failed because of the differential expansion rates between the metal tube and its enclosing glass vacuum bottle. The differential expansion rates of the metal and glass frequently cause the seal between the metal and glass members to fracture. In one system, a metal U-shaped tube was positioned within a transparent glass envelope with the ends of the U-shaped metal extending from the glass envelope. This system failed for several reasons, including differential expansion referred to above and because of structural loading of the U-tube under heat-stressed conditions. There have, however, been some successful vacuum insulated solar energy collectors. These systems are expensive since they normally eliminate all metal-to-glass seals, and rely upon an all-glass system. In addition to the inherent expense involved in such arrangements, such systems are also subject to greater damage due to glass breakage as well as problems for interfacing such systems with conventional metal heating system piping to which most systems have to be connected.

Other systems have been attempted, but none have been particularly satisfactory in providing a low-cost unit which is not likely to fracture when subject to heat stresses.

SUMMARY OF THE INVENTION

The present invention provides a solar energy collector having an improved means and method of maintaining a solar-heated metal tube under high vacuum conditions without interfering with the absorption of solar energy by the metal tube. A further object of the present invention is to provide an improved solar energy transducer comprising a metal tube through which solar-heated fluid may pass, which metal tube is enclosed along a major portion of its length by a transparent glass tube. A pair of metal annular bellows, each having an outer periphery sealed in a glass-to-metal seal to the glass tube, and an inner periphery sealed to the metal tube, define with the glass and metal tubes a vacuum chamber which may be maintained at high vacuums in the order of $10^{-6}$ torr.

The present invention also provides an improved means and method of sealing an outer glass tube to a coaxial or inner metal tube while adequately compensating for differential radial and linear expansion of the two tubes. A further object of the present invention is to provide a solar energy collector component that is compatible with conventional piping and may readily be adapted and connected into suitable heating systems. A further object of the present invention is to provide an improved solar energy collector having a metal tube enclosed along a major portion of its length by an outer glass tube with a narrow path of heat flow to the glass. A still further object of the present invention is to provide an improved solar energy collector system in which there are no cantilevered loads on the end seals. A still further object of the present invention is to provide an improved arrangement of an inner metal tube for absorbing solar energy and an outer glass tube designed to provide the outer wall of a vacuum system, which system may be formed with dimensions of from ¼ inches to 12 inches and in lengths that extend up to several feet.

DETAILED DESCRIPTION OF DRAWINGS

The foregoing objects and advantages of the present invention will be more clearly understood when considered in conjunction with the accompanying drawings in which:

FIG. 1 is a cross-sectional view of a preferred embodiment of the present invention;

FIG. 2 is an end view of the embodiment shown in FIG. 1;

FIG. 3 is a side elevational view of another embodiment of the invention;

FIG. 4 is an end view of the embodiment shown in FIG. 3; and

FIG. 5 is an end view of an array of metal tubes in a parabolic system.

DETAILED DESCRIPTION OF PREFERRED EMBODIMENT

Referring to FIGS. 1 and 2, there is illustrated an arrangement of a preferred embodiment of the present invention. In this arrangement, the metal pipe or tube 1 is designed to conduct a suitable fluid media, such as water, in a solar energy conversion system. The water flows through the metal pipe 1 from one end, as for example, end 2, through the pipe to end 3. These ends may be connected into a suitable solar system in which water heated in the pipe 1 is conveyed to a conventional heat sink or other heat dissipating means and then returned, after being cooled, to end 2. The specifics of the heating system itself may be conventional and do not form a part of this invention.

The metal pipe 1 may be of any conventional metal as, for example, copper, and may be coated or covered with a suitable and known absorption layer, such, for example, as a flat black paint. Each end of tube 1 may be suitably threaded for connection to piping in the heating system. The tube 1 may have an outer diameter from in the order of ¼ inch to a much larger system in the order of 11 or 12 inches. Conventionally, however, the tube 1 would ordinarily have an outer diameter in the order of ½ inch.

Preferably coaxial with, and enclosing the tube 1 is an outer transparent glass tube 4. Tube 4 is preferably made of clear glass, with a wall thickness, when considering its length and diameter, to withstand vacuums within it of as low as one atmosphere. The glass tube 4 may have an outer diameter in the order of ½ inch to as much as 12 inches, but preferably, would, in most systems, have a diameter of 1 inch.

The metal tube 4 and glass tube 3 may vary in length, but typically may have a length of approximately 42 to 43 inches.

A pair of bellows 7 and 8 are positioned respectively at ends 2 and 3 of the pipe 1. These bellows are made of metal and are designed to provide a glass-to-metal seal at the outer periphery 9 of the bellows, thereby sealing the bellows at the outer periphery to the glass tube 4 and an inner periphery 10, sealing the bellows at the inner ends to the inner edge of the tube 1.

In the embodiment of FIG. 1, the bellows are elongated with a plurality of longitudinally annularly formed pleats 12, with these pleats or reverse annular bends longitudinally displaced one from the other. The bellows 7 and 8 may be conventionally welded to the metal tube 1 and sealed by conventional glass-to-metal techniques at the periphery 9 to the tube 4. Prior to sealing the tube 4 to the bellows 7 and 8, the interior of the tube 4 is evacuated, thereby providing a vacuum preferably in the order of $10^{-6}$ torr between the metal tube 1 and glass tube 4.

If desired, one or more glass fiber ring spacers may be annularly arranged about the tube 1 and within the tube 4, thus providing intermediate support of the tube 4 along its length.

A second embodiment of the present invention is illustrated in FIGS. 3 and 4. In this arrangement, the inner tube 20 is similar in configuration to the inner metal tube 1 and may be formed of similar material. The glass tube 21 is similar in configuration to the glass tube 4 and may be made of the same transparent material. The end bellows 22 and 23 are formed with an inner collar 24 defining the inner periphery. This collar 24 may be suitably welded by known techniques to the metal tube 20. Intermediate the collar 24 and the outer periphery 25 is the bellows sections 26 which is formed by a pair of annular reversely directed bent rings 27 and 28 which function to permit relative linear and radial movement of the glass and metal tubes. The outer periphery 25 is suitably Kovar or Monel welded to the glass tube after the tube has been evacuated to provide a vacuum between the glass tube and metal tube in the order of $10^{-6}$ torr.

What is claimed is:

1. In a solar energy collector having an elongated metal tube through which solar heated fluid may pass, said metal tube coated with a heat absorption layer and a transparent glass tube enclosing said metal tube, the improvement comprising, a pair of metal annular bellows each having its outer periphery sealed in a glass to metal seal to said glass tube and its inner periphery sealed to said metal tube, said bellows and said glass and metal tubes defining a vacuum chamber having an internal pressure in the order of $10^{-6}$ torr, said inner and outer peripheries of said bellows are longitudinally displaced from one another to accommodate differential radial and linear expansion of said metal and glass tubes.

2. In a solar energy collector as set forth in claim 1 the improvement further comprising said pair of metal annular bellows elongated with a plurality of longitudinally formed reversed annular bends longitudinally displaced one from the other and having said inner and outer peripheries of said bellows longitudinally displaced from one another to more effectively accommodate differential radial and linear expansion of said metal and glass tubes.

* * * * *